United States Patent
Wei et al.

(10) Patent No.: US 10,402,370 B2
(45) Date of Patent: Sep. 3, 2019

(54) INFORMATION PROCESSING METHOD AND ELECTRONIC APPARATUS

(71) Applicants: Beijing Lenovo Software Ltd., Beijing (CN); Lenovo (Beijing) Co., Ltd., Beijing (CN)

(72) Inventors: Min Wei, Beijing (CN); Shi Chen, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 753 days.

(21) Appl. No.: 14/983,897

(22) Filed: Dec. 30, 2015

(65) Prior Publication Data

US 2017/0091206 A1 Mar. 30, 2017

(30) Foreign Application Priority Data

Sep. 30, 2015 (CN) .......................... 2015 1 0642965

(51) Int. Cl.

| | |
|---|---|
| *G06F 16/11* | (2019.01) |
| *G06F 16/215* | (2019.01) |
| *G06F 12/0831* | (2016.01) |
| *G06F 12/128* | (2016.01) |
| *H04L 29/08* | (2006.01) |

(52) U.S. Cl.
CPC ........ *G06F 16/128* (2019.01); *G06F 12/0833* (2013.01); *G06F 12/128* (2013.01); *G06F 16/215* (2019.01); *H04L 67/2842* (2013.01); *G06F 2212/621* (2013.01)

(58) Field of Classification Search
None
See application file for complete search history.

(56) References Cited

U.S. PATENT DOCUMENTS

| 5,606,689 A * | 2/1997 | Nakagawa ............ G06F 3/0601 |
| 5,893,920 A * | 4/1999 | Shaheen ............ G06F 12/0813 707/E17.01 |
| 7,761,497 B1 * | 7/2010 | O'Connell, Jr. ... G06F 17/30902 709/201 |
| 2010/0082547 A1 * | 4/2010 | Mace .................. G06F 11/1435 707/648 |
| 2017/0011056 A1 * | 1/2017 | Saito ................ G06F 17/30117 |

OTHER PUBLICATIONS

GT Raju; Knowledge Discovery from Web Usage Data: Complete Preprocessing Methodology; IJCSNS; vol. 8; No. 1; Jan. 2009; pp. 179-186 (Year: 2009).*

* cited by examiner

*Primary Examiner* — Mariela Reyes
*Assistant Examiner* — Jermaine A Mincey
(74) *Attorney, Agent, or Firm* — Harness, Dickey & Pierce, P.L.C.

(57) ABSTRACT

An information processing method and an electronic apparatus are provided, for solving a technical problem of a weak capability of the electronic apparatus to process information. The method includes: acquiring M variation messages by monitoring variations of files in a file system of an electronic apparatus, where M is a positive integer; determining N files based on the M variation messages, where N is an integer less than or equal to M; identifying the N files respectively to determine at least one of the N files which meets a preset condition; and deleting the at least one file to reduce the amount of data stored in the electronic apparatus.

24 Claims, 2 Drawing Sheets

INFORMATION PROCESSING METHOD AND ELECTRONIC APPARATUS

CROSS REFERENCES OF RELATED APPLICATION

The present application claims the priority to Chinese Patent Application No. 201510642965.5, entitled "INFORMATION PROCESSING METHOD AND ELECTRONIC APPARATUS", filed on Sep. 30, 2015 with the State Intellectual Property Office of the People's Republic of China, which is incorporated herein by reference in its entirety.

FIELD

The present disclosure relates to a field of computer technologies, and in particular to an information processing method and an electronic apparatus.

BACKGROUND

With increasing development of science and technology, electronic technique is developed rapidly. There are more and more types of electronic products. People enjoy environments brought out by development of science and technology. Presently, people enjoy comfortable life brought out by development of science and technology via various types of electronic apparatus.

Multiple applications may be installed in an electronic apparatus by a user to fulfill requirements of daily works and entertainments. When run, the applications may generate a large amount of run-time files, such as cache file and temporary files, which are generally useless for the user, which are referred to as useless files for example. The operating speed of the electronic apparatus is reduced when the amount of useless files in the system reaches a certain value. Since the useless files occupy some of the storage space of the electronic apparatus, the utilization ratio of the storage space of the electronic apparatus is reduced, thereby affecting the use of the user.

Presently, the useless files in the electronic apparatus may be cleaned up via a third party software. Firstly, the user needs to download and install the third party software, initiates the third party software when to clean up the useless files, finds out the useless files by full scanning, and deletes the found useless files. The full scanning takes up generally much time, resulting in that the useless files are not cleaned up timely and efficiently and needs the manual intervention of the user, which is not convenient to the user, and the downloading, installing and running of the third party software itself takes up some of the system resources, resulting in waste in resources.

As can be seen, in the conventional art, the electronic apparatus cleans up the useless files by means of the third party software and the manual intervention of the user, and the inherent information processing ability of the electronic apparatus is poor, which is not convenient to be used by the user.

SUMMARY

An information processing method and an electronic apparatus are provided in an embodiment of the disclosure, for solving a technical problem of a weak capability of the electronic apparatus to process information.

In a first aspect, an information processing method is provided, which includes:

acquiring M variation messages by monitoring variations of files in a file system of an electronic apparatus, where M is a positive integer;

determining N files based on the M variation messages, wherein the N files are varied corresponding to the M variation messages, and N is an integer less than or equal to M;

identifying the N files respectively to determine at least one of the N files which meets a preset condition; and deleting the at least one file to reduce the amount of data stored in the electronic apparatus.

Optionally, before deleting the at least one file, the method further includes:

storing the M variation messages into a first level cache file folder sequentially, where the maximum number of file folders that the first level cache file folder is capable of storing is K, where K is an integer greater than or equal to 2;

grouping the M variation messages into N groups, where each variation message in a first group of the N groups corresponds to a first file which is one of the N files; and storing the N groups of variation messages into N variation message file folders of the first level cache file folder respectively, where the variation message file folders are configured to store the variation messages.

Optionally, after storing the N groups of variation messages into the N variation message file folders of the first level cache file folder respectively, the method further includes:

determining a first variation message file folder of the N variation message file folders in the case that N is greater than K; and releasing the first variation message file folder from the first level cache file folder.

Optionally, determining the first variation message file folder of the N variation message file folders includes:

determining the first variation message file folder with a variation message file folder including most variation messages; or determining the first variation message file folder with a variation message file folder which has a longest time period prior to a current time instant since a time instant of latest update, where the current time instant is a time instant at which the first variation message file folder is determined; or determining the first variation message file folder with a variation message file folder to which a file with a maximum amount of data corresponds.

Optionally, deleting the at least one file includes:

deleting the at least one file corresponding to variation messages included in the first variation message file folder; or deleting the at least one file corresponding to variation messages included in the first variation message file folder and deleting the first variation message file folder.

Optionally, before deleting the at least one file, the method further includes:

storing a file corresponding to variation messages included in the first variation message file folder into a second level cache file folder, where the maximum number of files that the second level cache file folder is capable of storing is Q, where Q is an integer greater than or equal to 2.

Optionally, deleting the at least one file includes:
deleting all files included in the second level cache file folder in the case that the number of files included in the second level cache file folder is equal to Q.

Optionally, determining the N files based on the M variation messages includes:
determining M files one-to-one corresponding to the M variation messages; and
determining the N files of the M files which have mutually different file names.

Optionally, identifying the N files respectively to determine the at least one of the N files which meets the preset condition includes:
determining the at least one of the N files which has a file name suffix belonging to a predetermined name suffix set.

Optionally, determining the N files based on the M variation messages includes:
determining M files one-to-one corresponding to the M variation messages;
determining N storing paths of M storing paths of the M files, wherein, the N storing paths are different from each other; and
determining the N files with N file folders corresponding to the N storing paths.

Optionally, identifying the N files respectively to determine the at least one of the N files which meets the preset condition includes:
determining at least one of N file folder names of the N file folders which belongs to a first predetermined file folder name set; and
determining the at least one file with at least one file folder corresponding to the at least one file folder name.

Optionally, deleting the at least one file includes:
deleting some of the at least one file folder, and displaying remaining file folders of the at least one file folder on a display unit of the electronic apparatus, where file folder names of the remaining file folders belong to a second predetermined file folder name set which is a subset of the first predetermined file folder name set;
receiving an deletion operation on the remaining file folders from a user; and
deleting the remaining file folders based on the deletion operation.

Optionally, identifying the N files respectively to determine the at least one of the N files which meets the preset condition includes:
determining the at least one file with at least one of the N file folders which is empty.

Optionally, after deleting the at least one file, the method further includes:
generating history deletion information for the at least one file, where the history deletion information is attribute information of the at least one file and/or operation information corresponding to an deletion operation performed on the at least one file; and
outputting the history deletion information.

In a second aspect, a first electronic apparatus is provided, which includes:
a housing; and
a processor configured to acquire M variation messages by monitoring variations of files in a file system of the electronic apparatus, to determine N files based on the M variation messages, and to identify the N files respectively to determine at least one of the N files which meets a preset condition, wherein the N files are varied corresponding to the M variation messages, M is a positive integer and N is an integer less than or equal to M.

Optionally, the processor is further configured to:
store the M variation messages into a first level cache file folder sequentially before deleting the at least one file, where the maximum number of file folders that the first level cache file folder is capable of storing is K, where K is an integer greater than or equal to 2;
group the M variation messages into N groups, where each variation message in a first group of the N groups corresponds to a first file which is one of the N files; and
store the N groups of variation messages into N variation message file folders of the first level cache file folder respectively, where the variation message file folders are configured to store the variation messages.

Optionally, the processor is further configured to:
determine a first variation message file folder of the N variation message file folders in the case that N is greater than K, after storing the N groups of variation messages into the N variation message file folders of the first level cache file folder respectively; and
release the first variation message file folder from the first level cache file folder.

Optionally, the processor is configured to:
determine the first variation message file folder with a variation message file folder including most variation messages; or
determine the first variation message file folder with a variation message file folder which has a longest time period prior to a current time instant since a time instant of latest update, where the current time instant is a time instant at which the first variation message file folder is determined; or
determine the first variation message file folder with a variation message file folder to which a file with a maximum amount of data corresponds.

Optionally, the processor is configured to:
delete the at least one file corresponding to variation messages included in the first variation message file folder; or
delete the at least one file corresponding to variation messages included in the first variation message file folder and deleting the first variation message file folder.

Optionally, the processor is further configured to:
store a file corresponding to variation messages included in the first variation message file folder into a second level cache file folder before deleting the at least one file, where the maximum number of files that the second level cache file folder is capable of storing is Q, where Q is an integer greater than or equal to 2.

Optionally, the processor is configured to:
delete all files included in the second level cache file folder in the case that the number of files included in the second level cache file folder is equal to Q.

Optionally, the processor is configured to:
determine M files one-to-one corresponding to the M variation messages; and
determine the N files of the M files which have mutually different file names.

Optionally, the processor is configured to:
determine the at least one of the N files which has a file name suffix belonging to a predetermined name suffix set.

Optionally, the processor is configured to:
  determine M files one-to-one corresponding to the M variation messages;
  determine N storing paths of M storing paths of the M files, wherein, the N storing paths are different from each other; and
  determine the N files with N file folders corresponding to the N storing paths.

Optionally, the processor is configured to:
  determine at least one of N file folder names of the N file folders which belongs to a first predetermined file folder name set; and
  determine the at least one file with at least one file folder corresponding to the at least one file folder name.

Optionally, the electronic apparatus further includes a display device configured to display information,
  where the processor is configured to:
  delete some of the at least one file folder, and display remaining file folders of the at least one file folder on a display unit of the electronic apparatus, where file folder names of the remaining file folders belong to a second predetermined file folder name set which is a subset of the first predetermined file folder name set;
  receive an deletion operation on the remaining file folders from a user; and
  delete the remaining file folders based on the deletion operation.

Optionally, the processor is configured to:
  determine the at least one file with at least one of the N file folders which is empty.

Optionally, the processor is configured to generate history deletion information for the at least one file, where the history deletion information is attribute information of the at least one file and/or operation information corresponding to an deletion operation performed on the at least one file; and
  the electronic apparatus further includes an outputting device configured to output the history deletion information.

In a third aspect, a second electronic apparatus is provided, which includes:
  an acquiring module configured to acquire M variation messages by monitoring variations of files in a file system of an electronic apparatus, where M is a positive integer;
  a first determining module configured to determine N files based on the M variation messages, wherein the N files are varied corresponding to the M variation messages, and N is an integer less than or equal to M;
  a second determining module configured to identify the N files respectively to determine at least one of the N files which meets a preset condition; and
  a deleting module configured to delete the at least one file to reduce the amount of data stored in the electronic apparatus.

In an embodiment of the disclosure, the electronic apparatus may determine N files based on M variation messages, identify and screen the N files to determine at least one of the N files which meets a preset condition, and delete the at least one file to reduce the amount of data stored in the electronic apparatus. The file meeting the preset condition may be considered to be the useless file.

That is to say, after determining the N files based on the variation messages, the electronic apparatus may screen the N files by using an identification mechanism, to determine at least one file which is the useless file. That is, the electronic apparatus may determine the useless file when the system is in operation, to record and identify automatically the useless file. Further, by deleting the at least one file, the useless file is cleaned up automatically, timely and quickly. By enhancing the information processing ability, the electronic apparatus may identify, record and delete automatically the useless file without the help of a third party software and manual intervention of the user, for reducing the occupation of the system resources as much as possible, saving the manual operation of the user, improving the intellectuality of the device, and improving the use experience of the user.

BRIEF DESCRIPTION OF THE DRAWINGS

The appended drawings to be used in the description of the embodiments or the conventional technology will be described briefly as follows, so that the technical solutions according to the embodiments of the present disclosure or according to the conventional technology will become clearer. It is obvious that the appended drawings in the following description only illustrate some embodiments of the present disclosure. For those skilled in the art, other appended drawings may be obtained according to these appended drawings without any creative work.

DETAILED DESCRIPTION OF EMBODIMENTS

The technical solutions in the embodiments of the present disclosure will be described clearly and completely hereinafter in conjunction with the drawings in the embodiments of the present disclosure, so that the objects, technical solutions and advantages of the present disclosure will be clear. Apparently, the described embodiments are only a part of rather than all of the embodiments of the present disclosure. All the other embodiments which can be obtained by those skilled in the art without creative effort on the basis of the embodiments of the present disclosure will fall within the scope of protection of the present disclosure. Embodiments of the disclosure and features in the embodiments of the disclosure may be combined in any manner without confliction. Although a logical order is shown in the flowchart, steps shown or described may be performed in an order different from the shown one.

Moreover, the term "and/or" herein is only intended to describe an association relation between associated objects, that is to say, the term is used to indicate three relations. For example, A and/or B may indicates three cases: only A exists, both A and B exist, or only B exists. Moreover, the character "/" herein is generally intended to indicate an "or" relation between the associated objects, unless otherwise specifically specified.

In an embodiment of the disclosure, an electronic apparatus may refer to a cell phone, a tablet computer (PAD), a notebook computer, a personal computer or the like, which is not limited herein.

The above technical solutions will be described in detail in conjunction with the drawings and the specific embodiments, so as to understand the above technical solutions better.

Figure 1:
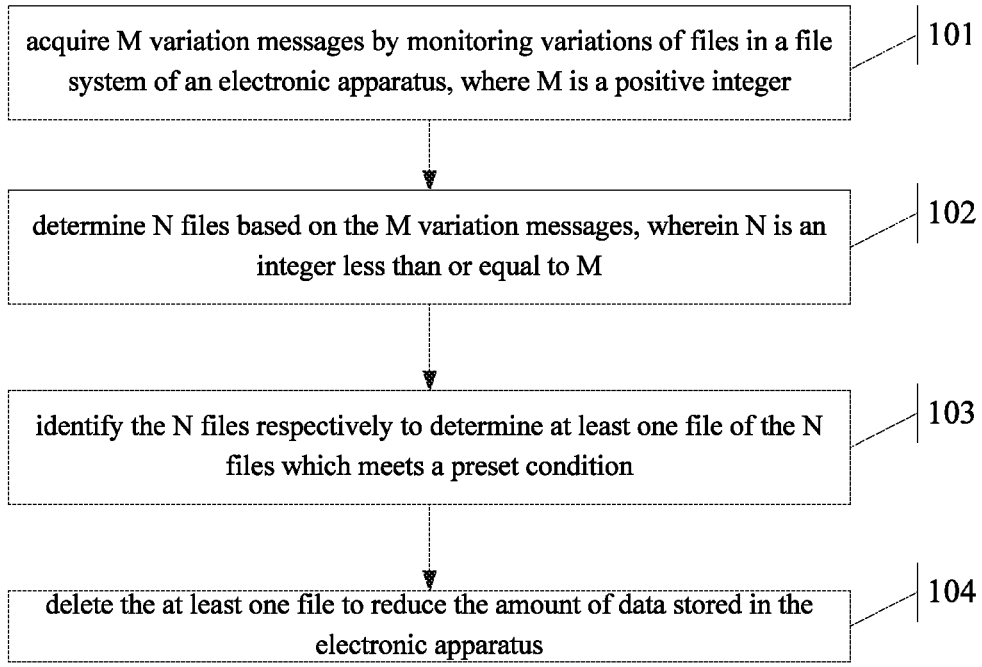
FIG. 1 is a flowchart of an information processing method according to an embodiment of the disclosure.

Referring to FIG. 1, an information processing method is provided in an embodiment of the disclosure. The method is applicable to an electronic apparatus. That is to say, steps in the method may be performed by the electronic apparatus. The method includes following steps 101 to 104.

In 101, M variation messages are acquired by monitoring variations of files in a file system of an electronic apparatus, where M is a positive integer.

In an embodiment of the disclosure, the electronic apparatus may monitor variations of files in the file system. Once the files vary, the electronic apparatus may acquire corresponding variation messages. Specifically, the variation messages may be acquired by calling back for example. That is, the variation messages may be acquired by running a callback function in the system.

M is a positive integer, such as 1, 5 or 10. The specific value of M may be set by the user, for example based on the performance of the electronic apparatus and different requirements of the user.

If M is equal to 1, it indicates that once one variation message is obtained, the electronic apparatus performs the subsequent steps based on the variation message, thereby monitoring and processing the variation message in real time with a strong timeliness.

If M is greater than 1, it indicates that after multiple variation messages are obtained, the electronic apparatus performs the subsequent steps based on the multiple variation messages. The electronic apparatus may process the M variation messages periodically, for reducing the processing times as much as possible. In the manner of batch processing, the access ratio to the system can be reduced as much as possible, thereby reducing the occupation of the system resources.

Specifically, for example, the variation message may refer to a message which is available to indicate a file varying, such as creation of a file, deletion of a file, modification of a file and duplication of a file.

Further, the M variation messages may be variation messages for the same file, and may also be variation messages for different files.

For example, assuming that M is 3, the M variation messages are respectively a variation message 1, a variation message 2 and a variation message 3. The variation messages 1-3 each may be a variation message for a file 1. In this case, the M variation messages each are variation messages for the same file. Alternatively, variation messages 1-2 are variation messages for the file 1, and variation message 3 is a variation message for a file 2. In this case, the M variation messages are variation messages for a plurality of files.

Moreover, types of the M variation messages may or may not be the same. For example, still taking the above example as an example, the variation messages 1 and 2 each may be a variation message for indicating that the file 1 is varied. Alternatively, the variation message 1 may indicate that the file 1 is created, and variation message 2 may indicate that the file 1 is modified.

In 102, N files are determined based on the M variation messages, wherein the N files are varied corresponding to the M variation messages, and N is an integer less than or equal to M.

Since the variation message is acquired based on the variation in the file, a corresponding varied file may be determined based on the variation message.

In the case that the M variation messages each are messages acquired based on the variation in the same file, the number of the varied files determined based on the M variation messages is one, that is, N in this case is 1.

In the case that the M variation messages each are messages acquired based on the variations in different files, the number of the varied files determined based on the M variation messages is M, that is, N in this case is equal to M.

In the case that some of the M variation messages each are messages acquired based on the variation in the same file, remaining variation messages of the M variation messages are messages acquired based on the variations in the mutually different files, the number of the varied files determined based on the M variation messages is greater than 1 and less than M, that is, N in this case is greater than 1 and less than M.

In an embodiment of the disclosure, the file of the N files may refer to the varied file itself, and may also refer to the file folder for storing the varied file. Since the file is varied, it considered that the file folder in which the varied file is stored is varied.

Optionally, in another embodiment of the disclosure, determining the N files based on the M variation messages includes:

determining M files one-to-one corresponding to the M variation messages; and determining the N files of the M files which have mutually different file names.

In an embodiment of the disclosure, the file of the N files refers to the varied file itself, and different files are distinguished and identified by different file names. Since the M variation messages may include multiple variation messages for the same file, N files may be determined based on the M variation messages.

Optionally, in another embodiment of the disclosure, determining the N files based on the M variation messages includes:

determining M files one-to-one corresponding to the M variation messages;

determining N storing paths of M storing paths of the M files, wherein, the N storing paths are different from each other; and determining the N files with N file folders corresponding to the N storing paths.

In an embodiment of the disclosure, the file of the N files refers to the file folder for storing the varied file. Specifically, different file folders may be distinguished and identified by specific storing paths (or file folder names) of the file folders.

After the N files are determined, the N files may be identified respectively, to screen at least one file from the N files which meets a preset condition. That is, step 103 may be performed.

In 103, the N files are identified respectively to determine at least one of the N files which meets a preset condition.

Specifically, meeting the preset condition may refer to being a useless file. That is, by identifying the N files, at least one file may be screened which is a useless file. The useless file may refer to a file which is not so useful or completely useless for the user, such as a cache file, a log file, a temporary file or an unloading residual file of an application program. The useless file, which is generated when the electronic apparatus is in operation, may occupy a large amount of storage space of the electronic apparatus if not being cleaned up timely, resulting in slower speed of the electronic apparatus and affecting the use of the electronic apparatus by the user.

That is, step 103 is mainly to screen the useless files from the N files, to ensure that the electronic apparatus can process the useless files timely, so as to "thin" the system, thereby increasing the utilization ratio of the storage space of the electronic apparatus, increasing the operation speed and fluency of the electronic apparatus and improving the use experience of the user.

In practice, screening from the N files may be embodied in various ways, to determine at least one file meeting the preset condition. That is, there may be multiple preset conditions.

For example, a first possible preset condition may be that a file name suffix of the file belongs to a predetermined name suffix set.

Optionally, in another embodiment of the disclosure, identifying the N files respectively to determine the at least one of the N files which meets the preset condition includes:

determining the at least one of the N files which has a file name suffix belonging to a predetermined name suffix set.

That is, in the case that the file of the N files is the varied file itself, at least one file having the file name suffix belonging to the predetermined name suffix set may be screened by identifying the file name suffix of the file. The method for screening from the N files based on the file name suffix has stronger pertinence and higher accuracy.

Generally, the useless file may refer to a type of files with a specific file name suffix. For example, a file with a file name suffix of ".log" is a log file, a file with a file name suffix of ".tmp" is a temporary file, a file with a file name suffix of ".chk" is a disk checking file. The file name suffix of the useless file may be pre-stored in the predetermined name suffix set. For screening, matching detection may be performed between the file name suffixes of the N files and the name suffixes in the predetermined name suffix set, to screen at least one file which meets the preset condition from the N files.

For example, a second possible preset condition is that a file folder name of a file folder belongs to a first predetermined file folder name set.

Optionally, in another embodiment of the disclosure, identifying the N files respectively to determine the at least one of the N files which meets the preset condition includes:

determining at least one of N file folder names of the N file folders which belongs to a first predetermined file folder name set; and determining the at least one file with at least one file folder corresponding to the at least one file folder name.

That is, in the case that the file of the N files is the file folder in which the varied file is included, at least one file may be screened which belongs to the predetermined file folder name set, by identifying the file folder name of the file folder.

For an application program in the electronic apparatus, there is a specific file folder for storing various corresponding files. For example, by taking QQ as an example, there is a "QQ monitoring log" file folder, a "QQ temporary cache" file folder, a "QQ login log" file folder, a "QQ application center picture cache" file folder, a "QQ picture cache" file folder and the like. The file folder name of the useless file folder may be pre-stored in the predetermined file folder name set. For screening, matching detection may be performed between the file folder names of the N file folders and the file folder names in the predetermined file folder name set, to screen at least one file folder which meets the preset condition, from the N file folders. The at least one file folder is the at least one file.

Further, after screening from the N file folders are performed based on the file folder name, screening may be further performed on the file folder which does not meet the preset condition. For example, secondary screening may be performed, based on the file name suffix, on the files included in the file folder which does not meet the preset condition. That is, the primary screening may be performed based on the file folder name, and the secondary screening may be performed based on the file name suffix, so that as many as possible useless files are screened, to increase the efficiency and accuracy of the screening, and clean up the useless file quickly and completely.

For example, a third possible preset condition is that the file folder is an empty file folder.

Optionally, in an embodiment of the disclosure, identifying the N files respectively to determine the at least one of the N files which meets the preset condition includes:

determining the at least one file with at least one of the N file folders which is empty.

That is, in the case that the file of the N files is a file folder, the screening may be performed by judging whether the file folder is an empty file folder.

For example, for some unloading residual file folders, all files in these file folders have been deleted, but these file folders themselves are remained due to the un-complete unloading. This type of file folders are useless for the user, and may be screened by judging whether they are empty file folders.

Further, considering that some empty file folders are newly created as required by the system operation, it is determined whether a file was ever stored in the file folder after the file folder is empty, and it is determined that the included file has been deleted, to prevent the file folder from being deleted by mistake, thereby increasing the accuracy of the screening as much as possible and avoiding the subsequent error deleting as much as possible.

In 104, the at least one file is deleted to reduce the amount of data stored in the electronic apparatus.

After the at least one file is screened from the N files, the at least one file may be deleted since the at least one file is a useless file, to release the storage space occupied by the at least one file to reduce the amount of data stored in the electronic apparatus, thereby cleaning up the useless file timely.

To further reduce the amount of data stored in the electronic apparatus, the variation message corresponding to the at least one file may be deleted after the at least one file is deleted.

Further, the electronic apparatus may delete the at least one file in accordance with a predetermined strategy.

For example, the at least one file may be deleted upon determination, that is, deleted timely. The in-time deleting may ensure the timeliness of the cleaning up of the useless file.

Alternatively, the at least one file may be cleaned up regularly. In practice, the electronic apparatus may firstly repeat steps 101-103, that is, acquire multiple groups of at least one file, and then delete the multiple determined groups of at least one file at predetermined time instants, so that frequent access to the system is reduced in the batching deleting manner, thereby decreasing the occupation of the system resources.

Alternatively, the files may be deleted when the amount of the files reaches a predetermined value (such as 500 M). Similar to the regular deleting, frequent access to the system is reduced in the batch deleting manner, thereby decreasing the occupation of the system resources.

Optionally, in another embodiment of the disclosure, deleting the at least one file includes:

deleting some of the at least one file folder, and displaying remaining file folders of the at least one file folder on a display unit of the electronic apparatus, where file folder names of the remaining file folders belong to a second predetermined file folder name set which is a subset of the first predetermined file folder name set;

receiving an deletion operation on the remaining file folders from a user; and deleting the remaining file folders based on the deletion operation.

That is, in the case that the at least one file is at least one file folder, the at least one file folder may be deleted in categories to prevent the user file from being deleted by mistake. For example, some file folders which are determined by the electronic apparatus as useless files doubtlessly are deleted directly, and file folders which may be useful to the user are displayed on a display unit and then deleted by the user manually.

Specifically, whether a file included in a file folder is useful for the user may be determined as follows. Generally, the file included in the file folder such as DCIM (photo) file folder, PIC (picture) file folder, DOC (document) file folder, VIDEO (video) file folder may be considered to be useful for the user, which may be referred to as a user file for example, since the file included in this type of file folder is generally stored by the user himself. For example, a photo in the DCIM file folder is generally taken by the user, or a video in the VIDEO file folder is generally recorded or downloaded by the user specially. Thus, to avoid error deletion as much as possible, before deleting this type of file folder, the electronic apparatus displays the file folder for the user, and whether to delete is determined by the user as required after seeing the file folder.

For example, the video in the VIDEO file folder may have not been watched by the user, and thus the user may not wish it to be deleted. Alternatively, the video in the VIDEO file folder may have been watched and will not be watched by the user, and thus the user may wish it to be deleted. In practice, the user may determine whether to delete the file folder according to his own will, and control manually the electronic apparatus to delete the file folder in a positive case.

Further, the file folder names included in the second determined file folder name set may be file folder names preset by the user or have been set before the electronic apparatus leaves the factory for indicating that the file may be a user file, so that the accuracy of deleting is increased and error deleting resulting in file loss is avoided as much as possible.

In an embodiment of the disclosure, to avoid error deleting as much as possible to increase the accuracy, the electronic apparatus may perform the secondary screening based on the second predetermined file folder name set to screen the user file closer related to the user and more useful for the user, and display the user file to determine whether to delete based on manual identification and distinguishing by the user. That is, the electronic apparatus may provide the user with an interface for human-machine interaction, to ensure the accuracy of deleting, thereby enhancing the operability of the electronic apparatus and facilitating the practical use by the user.

Optionally, in another embodiment of the disclosure, after deleting the at least one file, the method further includes:

generating history deletion information for the at least one file, where the history deletion information is attribute information of the at least one file and/or operation information corresponding to an deletion operation performed on the at least one file; and outputting the history deletion information.

The attribute information of the at least one file may refer to information such as the amount, names and data amount of the files of the at least one file, and the operation information may refer to information such as time and specific manner of the deletion operation of the user.

The output manner may be for example display output, that is, displaying the history deletion information on the display unit of the electronic apparatus, or be for example voice output. Alternatively, the history deletion information may be sent to other electronic apparatus used by the user, so as to be seen by the user timely. Alternatively, the history deletion information may be output in any other way, which is not listed one by one here.

The electronic apparatus may store the history deletion information at a predetermined position, so as to be seen and analyzed by the user manually. The predetermined position may be preset by the user, and may also be set by the electronic apparatus in default.

Optionally, in another embodiment of the disclosure, before deleting the at least one file, the method further includes:

storing the M variation messages into a first level cache file folder sequentially, where the maximum number of file folders that the first level cache file folder is capable of storing is K, where K is an integer greater than or equal to 2;

grouping the M variation messages into N groups, where each variation message in a first group of the N groups corresponds to a first file which is one of the N files; and storing the N groups of variation messages into N variation message file folders of the first level cache file folder respectively, where the variation message file folders are configured to store the variation messages.

In practice, the files in the file system are varied frequently. For example, for WeChat, during the chatting of the user by using the WeChat, the system file may be modified and updated frequently. The same goes with other applications. If the corresponding varied file is processed (such as deleted) every time one variation message is acquired, the occupation of the system resources is very high, resulting in possibly too high access frequency to the file system and increasing operation load of the system.

To reduce the access frequency to the file system, in an embodiment of the disclosure, a first level cache file folder may be provided to solve the above problem. The maximum number of file folders that the first level cache file folder is capable of storing may be set to be an integer greater than or equal to 2. In practice, the value of K may be specifically set based on the performance of the electronic apparatus or the requirement of the user.

Specifically, the M variation messages may be classified into N groups of variation messages based on whether the variation message is for the same file, and the N groups of variation messages are stored respectively into N variation message file folders in the first level cache file folder, so as to classify and batch store the variation messages and facilitate unified management. In practice, the electronic apparatus may acquire the variation message continuously. For example, after the M variation messages are classified and batch stored after being obtained for a first time, the M variation messages may be acquired for a second time, and the obtained M variation messages are classified and batch stored based on the original classification and batch storing.

Assuming that 5 variation messages are obtained, which are respectively a variation message 1, a variation message 2, a variation message 3, a variation message 4 and a variation message 5 based on the sequential order of acquisition time. The variation messages 1 and 3 each are variation messages for a file A, the variation messages 2 and 5 each are variation messages for a file B, and the variation message 4 is a variation message for a file C. Thus, the 5 variation messages may be classified into three groups of variation messages based on the file A, the file B and the file C.

A first group of variation messages for the file A includes the variation messages 1 and 3;

a second group of variation messages for the file B includes the variation messages 2 and 5; and a third group of variation messages for the file C includes the variation message 4.

When the above five variation messages are stored sequentially into the first level cache file folder, the first level cache file folder may be indicated as {the variation message 1, the variation message 2, the variation message 3, the variation message 4, the variation message 5}.

When the first group to the third group of variation messages are stored respectively into the three variation message file folders in the first level cache file folder, the first level cache file folder may be indicated as {{the variation message 1, the variation message 3}, {the variation message 2, the variation message 5 }, {the variation message 4} }, and the three variation message file folders are for example a first variation message file folder, a second variation message file folder and a third variation message file folder. The first variation message file folder may be indicated as {the variation message 1, the variation message 3}, the second variation message file folder may be indicated as {the variation message 2, the variation message 5}, and the third variation message file folder may be indicated as {the variation message 4 }.

By setting the first level cache file folder, the obtained variation messages may be classified and batch stored firstly to obtain as many as possible variation messages. Specifically, the useless files are accumulated firstly in the file system, and when the amount of the accumulated files reaches a certain value, the accumulated useless files are deleted together. In this manner, the number of accesses to the file system resulting from frequent deletion may be reduced as much as possible, thereby reducing the occupation of the resources as much as possible.

Optionally, in another embodiment of the disclosure, after storing the N groups of variation messages into the N variation message file folders of the first level cache file folder respectively, the method further includes:

determining a first variation message file folder of the N variation message file folders in the case that N is greater than K; and releasing the first variation message file folder from the first level cache file folder.

In the case that the number of the variation message file folders in the first level cache file folder is greater than the maximum number of the variation message file folders that the first level cache file folder is capable of storing, it indicates that a certain amount of useless files have been accumulated in the file system. To clean up the useless files timely at a suitable system access frequency, the amount of data in the file system may be reduced by deleting timely the files corresponding to the variation messages included in the first variation message file folder. The first variation message file folder may be released from the first level cache file folder and the file corresponding to the variation messages in the first variation file folder is deleted.

After the first variation message file folder is released from the first level cache file folder for a first time, another first variation message file folder is released from the first level cache file folder for a second time in the case that the number of the file folders included in the first level cache file folder is again greater than K. That is, the steps in the embodiment of the disclosure may be performed repeatedly. In practice, the first variation message file folder released from the first level cache file folder for each time may be different and include a different variation message or messages.

It is to be noted, the first variation message file folder in an embodiment of the disclosure may refer to particularly a variation message file folder meeting a certain condition.

Optionally, in another embodiment of the disclosure, determining the first one of the N variation message file folders includes:

determining the first variation message file folder with a variation message file folder including most variation messages; or determining the first variation message file folder with a variation message file folder which has a longest time period prior to a current time instant since a time instant of latest update, where the current time instant is a time instant at which the first variation message file folder is determined; or determining the first variation message file folder with a variation message file folder to which a file with a maximum amount of data corresponds.

The variation message file folder including most variation messages are included may be determined as the first variation message file folder to be released from the first level cache file folder. The greater the number of the variation messages that are included is, the more the amount of the data of the corresponding varied file is. In this way, files having a larger amount of data may be deleted by one deletion, thereby increasing the cleaning up efficiency of the useless file.

The variation message file folder which has a longest time period prior to a current time instant since a time instant of latest update may be determined as the first variation message file folder to be released from the first level cache file folder. The further the time instant of latest update from the current time instant is, the older the last use of the user from now is, and these files may not be used by the user any more currently. In this way, accordance with the practical use of the user is achieved as much as possible.

The variation message file folder to which a file with a maximum amount of data corresponds is determined as the first variation message file folder to be released from the first level cache file folder. In this way, the file with a maximum amount of data can be deleted, thereby releasing more storage space for the electronic apparatus.

Optionally, in an embodiment of the disclosure, deleting the at least one file includes:

deleting the at least one file corresponding to variation messages included in the first variation message file folder; or deleting the at least one file corresponding to variation messages included in the first variation message file folder and deleting the first variation message file folder.

That is, only the file corresponding to the first variation message file folder is deleted, or both the file corresponding to the first variation message file folder and the first variation message file folder are deleted. In this way, more storage space can be released, thereby deleting the useless file timely and efficiently.

Optionally, in another embodiment of the disclosure, before deleting the at least one file, the method further includes:

storing the file corresponding to variation messages included in the first variation message file folder into a second level cache file folder, where the maximum number of files that the second level cache file folder is capable of storing is Q, where Q is an integer greater than or equal to 2.

To batch delete the useless files to enhance the batch process performance of the electronic apparatus, a second level cache file folder may be provided for storing multiple useless files, and the multiple stored useless files are batch deleted. In this way, the number of accesses to the system is reduced, and the occupation of the system resources is decreased.

Specifically, after the first variation message file folder is released from the first level cache file folder, the variation file corresponding to the first variation message file folder may be stored into the second level cache file folder. In the case that multiple first variation message file folders are released from the first level cache file folder, multiple corresponding files are stored in the second level cache file folder.

Before the file corresponding to the first variation message file folder is stored into the second level cache file folder, the file may be identified by using the same method as that in step 102. The file is considered to be a useless file only when it meets the preset condition, and then it is stored into the second level cache file folder, for improving the accuracy of the deletion as much as possible.

The number of the file folders that the first level cache file folder is capable of storing and that of the files the second level cache file folder is capable of storing may be the same or may be not the same. That is, K may be equal to Q or may be not equal to Q. The specific values of K and Q may be set based on factors, such as the performance of the electronic apparatus and the usage custom of the user, which will not be limited here.

Optionally, in another embodiment of the disclosure, deleting the at least one file includes:

deleting all files included in the second level cache file folder in the case that the number of files included in the second level cache file folder is equal to Q.

That is, the number of the files in the second level cache file folder being equal to Q may be taken as a trigger condition to trigger the electronic apparatus to delete all the files in the second level cache file folder, so as to batch delete files. In this way, with reduction in occupation of system resources, the useless files are batch deleted timely, thereby increasing the process efficiency of the useless files by the apparatus.

Before all the files are deleted, the amount of data of each of the files may be determined, to be seen and analyzed by the user subsequently.

In an embodiment of the disclosure, the electronic apparatus may determine N files based on M variation messages, identify and screen the N files to determine at least one of the N files which meets a preset condition, and delete the at least one file to reduce the amount of data stored in the electronic apparatus. The file meeting the preset condition may be considered to be the useless file.

That is to say, after determining the N files based on the variation messages, the electronic apparatus may screen the N files by using an identification mechanism, to determine at least one file which is the useless file. That is, the electronic apparatus may determine the useless file when the system is in operation, to record and identify automatically the useless file. Further, by deleting the at least one file, the useless file is cleaned up automatically, timely and quickly.

By enhancing the information processing ability, the electronic apparatus may identify, record and delete automatically the useless file without the help of a third party software and the manual intervention of the user, for reducing the occupation of the system resources as much as possible, saving the manual operation of the user, improving the intellectuality of the device, and improving the use experience of the user.

Figure 2:
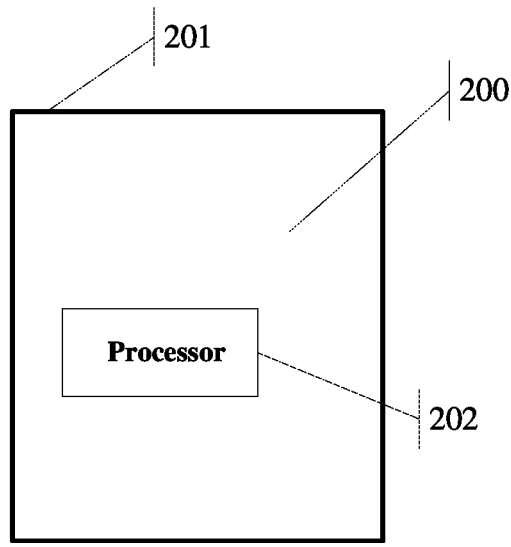
FIG. 2 is a schematic structural diagram of an electronic apparatus according to an embodiment of the disclosure.

Referring to FIG. 2, based on the same inventive conception as above, a first electronic apparatus 200 is provided in an embodiment of the disclosure. The electronic apparatus 200 includes:

a housing 201; and a processor 202, provided inside the housing 201 and configured to acquire M variation messages by monitoring variations of files in a file system of an electronic apparatus 200, to determine N files based on the M variation messages, and to identify the N files respectively to determine at least one of the N files which meets a preset condition, wherein the N files are varied corresponding to the M variation messages, M is a positive integer and N is an integer less than or equal to M.

The processor 202 may be a general Central Processing Unit (CPU), or may be an Application Specific Integrated Circuit (ASIC), or may be one or more integrated circuits for controlling executing of the program.

The electronic apparatus 200 may further include a storage. The number of the storage may be one or more. The storage may include a Read Only Memory (ROM), a Random Access Memory (RAM) or a disk storage.

Optionally, in another embodiment of the disclosure, the processor 202 is further configured to:

store the M variation messages into a first level cache file folder sequentially before deleting the at least one file, where the maximum number of file folders that the first level cache file folder is capable of storing is K, where K is an integer greater than or equal to 2;

group the M variation messages into N groups, where each variation message in a first group of the N groups corresponds to a first file which is one of the N files; and store the N groups of variation messages into N variation message file folders of the first level cache file folder respectively, where the variation message file folders are configured to store the variation messages.

Optionally, in another embodiment of the disclosure, the processor 202 is further configured to:

determine a first variation message file folder of the N variation message file folders, in the case that N is greater than K after storing the N groups of variation messages into the N variation message file folders of the first level cache file folder respectively; and release the first variation message file folder from the first level cache file folder.

Optionally, in another embodiment of the disclosure, the processor 202 is configured to:

determine the first variation message file folder with a variation message file folder including most variation messages; or determine the first variation message file folder with a variation message file folder which has a longest time period prior to a current time instant since a time instant of latest update, where the current time instant is a time instant at which the first variation message file folder is determined; or determine the first variation message file folder with a variation message file folder to which a file with a maximum amount of data corresponds.

Optionally, in another embodiment of the disclosure, the processor 202 is configured to:

delete the at least one file corresponding to variation messages included in the first variation message file folder; or delete the at least one file corresponding to variation messages included in the first variation message file folder and deleting the first variation message file folder.

Optionally, in another embodiment of the disclosure, the processor 202 is further configured to:

store the file corresponding to variation messages included in the first variation message file folder into a second level cache file folder before deleting the at least one file, where the maximum number of files that the second level cache file folder is capable of storing is Q, where Q is an integer greater than or equal to 2.

Optionally, in another embodiment of the disclosure, the processor 202 is configured to:

delete all files included in the second level cache file folder in the case that the number of files included in the second level cache file folder is equal to Q.

Optionally, in another embodiment of the disclosure, the processor 202 is configured to:

determine M files one-to-one corresponding to the M variation messages; and determine the N files of the M files which have mutually different file names.

Optionally, in another embodiment of the disclosure, the processor 202 is configured to:

determine the at least one of the N files which has a file name suffix belonging to a predetermined name suffix set.

Optionally, in another embodiment of the disclosure, the processor 202 is configured to:

determine M files one-to-one corresponding to the M variation messages;

determine N storing paths of M storing paths of the M files, wherein N storing paths are different from each other; and determine the N files with N file folders corresponding to the N storing paths.

Optionally, in another embodiment of the disclosure, the processor 202 is configured to:

determine at least one of N file folder names of the N file folders which belongs to a first predetermined file folder name set; and determine the at least one file with at least one file folder corresponding to the at least one file folder name.

Optionally, in another embodiment of the disclosure, the electronic apparatus 200 further includes a display device configured to display information, where the processor 202 is configured to:

delete some of the at least one file folder, and display remaining file folders of the at least one file folder on the display device, where file folder names of the remaining file folders belong to a second predetermined file folder name set which is a subset of the first predetermined file folder name set;

receive an deletion operation on the remaining file folders from a user; and delete the remaining file folders based on the deletion operation.

The display device may be a Light Emitting Diode (LED) display screen, an Organic Light Emitting Diode (OLED) display screen, an Active Matrix Organic Light Emitting Diode (AMOLED) display screen, an In-Plane Switching (IPS) display screen and the like. The display device may have multiple lateral sides, and the multiple lateral sides may form a rectangle-like shape.

The processor 202 may be connected with the display device via a connecting line which serves to transmit a signal. That is, an electrical connection between the processor 202 and the display device may be kept for controlling the display device to display information.

Optionally, in another embodiment of the disclosure, the processor 202 is configured to:

determine the at least one file with at least one file folder of the N file folders which is empty.

Optionally, in another embodiment of the disclosure, the processor 202 is configured to:

generate history deletion information for the at least one file, where the history deletion information is attribute information of the at least one file and/or operation information corresponding to an deletion operation performed on the at least one file; and the electronic apparatus 200 further includes an outputting device configured to:

output the history deletion information.

Specifically, the outputting device may be different depending on the outputting manner. For example, in the case the outputting is performed by displaying, the outputting device may be the display device of the electronic apparatus 200. That is, the outputting device and the displaying device is the same one device. In the case that the outputting is performed in voice, the outputting device may be a voice outputting device of the electronic apparatus 200, such as a speaker.

Since the electronic apparatus 200 in the embodiment of the disclosure has the same principle for solving problem as that in the information processing method in FIG. 1, embodying of the electronic apparatus 200 in the embodiment of the disclosure may refer to the embodying of the information processing method in FIG. 1, and it is not described in details herein.

In an embodiment of the disclosure, the electronic apparatus 200 may determine N files based on M variation messages, identify and screen the N files to determine at least one of the N files which meets a preset condition, and delete the at least one file to reduce the amount of data stored in the electronic apparatus 200. The file meeting the preset condition may be considered to be the useless file.

That is to say, after determining the N files based on the variation messages, the electronic apparatus 200 may screen the N files by means of an identification mechanism, to determine at least one file which is the useless file. That is, the electronic apparatus 200 may determine the useless file when the system is in operation, to record and identify automatically the useless file. Further, by deleting the at least one file, the useless file is cleaned up automatically, timely and quickly. By enhancing the information processing ability, the electronic apparatus 200 may identify, record and delete automatically the useless file without the help of a third party software and the manual intervention of the user, for reducing the occupation of the system resources as much as possible, saving the manual operation of the user, improving the intellectuality of the device, and improving the use experience of the user.

Figure 3:
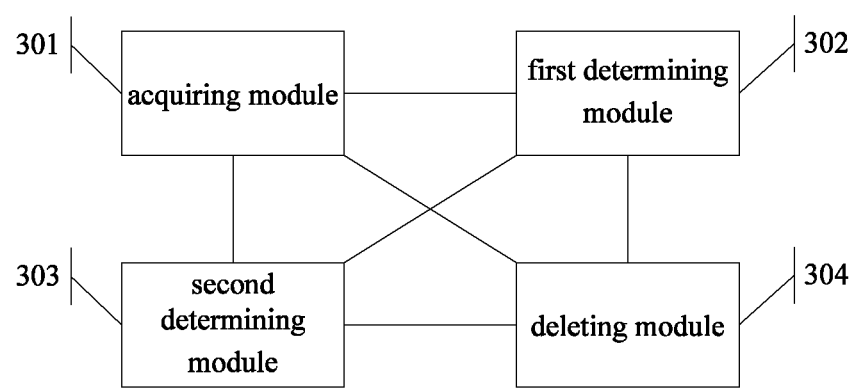
FIG. 3 is a block diagram of a structure of an electronic apparatus according to an embodiment of the disclosure.

Referring to FIG. 3, based on the same conception as above, a second electronic apparatus is provided. The electronic apparatus includes an acquiring module 301, a first determining module 302, a second determining module 303 and a deleting module 304.

The acquiring module 301 is configured to acquire M variation messages by monitoring variations of files in a file system of an electronic apparatus, where M is a positive integer.

The first determining module 302 is configured to determine N files based on the M variation messages, wherein the N files are varied corresponding to the M variation messages, and N is an integer less than or equal to M.

The second determining module 303 is configured to identify the N files respectively to determine at least one of the N files which meets a preset condition.

The deleting module 304 is configured to delete the at least one file to reduce the amount of data stored in the electronic apparatus.

Optionally, in another embodiment of the disclosure, the electronic apparatus further include a first storing module, a grouping module and a second storing module.

The first storing module is configured to store the M variation messages into a first level cache file folder sequentially before the at least one file is deleted by the deleting module 304, where the maximum number of file folders that the first level cache file folder is capable of storing is K, where K is an integer greater than or equal to 2.

The grouping module is configured to group the M variation messages into N groups, where each variation message in a first group of the N groups corresponds to a first file which is one of the N files.

The second storing module is configured to store the N groups of variation messages into N variation message file folders of the first level cache file folder respectively, where the variation message file folders are configured to store the variation messages.

Optionally, in another embodiment of the disclosure, the electronic apparatus further includes a third determining module and a releasing module.

The third determining module is configured to determine a first variation message file folder of the N variation message file folders in the case that N is greater than K after the second storing module stores the N groups of variation messages into the N variation message file folders of the first level cache file folder respectively.

The releasing module is configured to release the first variation message file folder from the first level cache file folder.

Optionally, in another embodiment of the disclosure, the third determining module is configured to:

determine the first variation message file folder with a variation message file folder including most variation messages; or determine the first variation message file folder with a variation message file folder which has a longest time period prior to a current time instant since a time instant of latest update, where the current time instant is a time instant at which the first variation message file folder is determined; or determine the first variation message file folder with a variation message file folder to which a file with a maximum amount of data corresponds.

Optionally, in another embodiment of the disclosure, the deleting module 304 is configured to:

delete the at least one file corresponding to variation messages included in the first variation message file folder; or delete the at least one file corresponding to variation messages included in the first variation message file folder and deleting the first variation message file folder.

Optionally, in another embodiment of the disclosure, the electronic device further includes a third storing module configured to:

store the file corresponding to variation messages included in the first variation message file folder into a second level cache file folder before the at least one file is deleted by the deleting module 304, where the maximum number of files that the second level cache file folder is capable of storing is Q, where Q is an integer greater than or equal to 2.

Optionally, in another embodiment of the disclosure, the deleting module 304 is configured to:

delete all files included in the second level cache file folder in the case that the number of files included in the second level cache file folder is equal to Q.

Optionally, in another embodiment of the disclosure, the first determining module 302 is configured to:

determine M files one-to-one corresponding to the M variation messages; and determine the N files of the M files which have mutually different file names.

Optionally, in another embodiment of the disclosure, the second determining module 303 is configured to:

determine the at least one of the N files which has a file name suffix belonging to a predetermined name suffix set.

Optionally, in another embodiment of the disclosure, the first determining module 302 is configured to:

determine M files one-to-one corresponding to the M variation messages;

determine N storing paths of M storing paths of the M files, wherein, the N storing paths are different from each other; and determine the N files with N file folders corresponding to the N storing paths.

Optionally, in another embodiment of the disclosure, the second determining module 303 is configured to:

determine at least one of N file folder names of the N file folders which belongs to a first predetermined file folder name set; and determine the at least one file with at least one file folder corresponding to the at least one file folder name.

Optionally, in another embodiment of the disclosure, the deleting module 304 is configured to:

delete some of the at least one file folder, and display remaining file folders of the at least one file folder on a display unit of the electronic apparatus, where file folder names of the remaining file folders belong to a second predetermined file folder name set which is a subset of the first predetermined file folder name set;

receive an deletion operation on the remaining file folders from a user; and delete the remaining file folders based on the deletion operation.

Optionally, in another embodiment of the disclosure, the second determining module 303 is configured to:

determine the at least one file with at least one of the N file folders which is empty.

Optionally, in another embodiment of the disclosure, the electronic apparatus further includes a generating module and an outputting module.

The generating module is configured to generate history deletion information for the at least one file after the at least one file is deleted by the deleting module 304, where the history deletion information is attribute information of the at least one file and/or operation information corresponding to a deletion operation performed on the at least one file.

The outputting module is configured to output the history deletion information.

Since the electronic apparatus in the embodiment of the disclosure has the same principle for solving problem as that in the information processing method in FIG. 1, embodying of the electronic apparatus in the embodiment of the disclosure may refer to the embodying of the information processing method in FIG. 1 and it is not described in details herein.

In an embodiment of the disclosure, the electronic apparatus may determine N files based on M variation messages, identify and screen the N files to determine at least one of the N files which meets a preset condition, and delete the at least one file to reduce the amount of data stored in the electronic apparatus. The file meeting the preset condition may be considered to be the useless file.

That is to say, after determining the N files based on the variation messages, the electronic apparatus may screen the N files by using an identification mechanism, to determine at least one file which is the useless file. That is, the electronic apparatus may determine the useless file when the system is in operation, to record and identify automatically the useless file. Further, by deleting the at least one file, the useless file is cleaned up automatically, timely and quickly. By enhancing the information processing ability, the electronic apparatus may identify, record and delete automatically the useless file without the help of a third party software and the manual intervention of the user, for reducing the occupation of the system resources as much as possible, saving the manual operation of the user, improving the intellectuality of the device, and improving the use experience of the user.

It is to be known clearly by those skilled in the art that, for convenient and clear description, the above division of the above functional modules is only taken as an example. In practice, the above functions may be allocated to different functional units as required. That is, the internal structure of the device is divided into different functional units for performing some or all of the functions described above. For specific operation processes of the above system, apparatus and units, reference may be made to the corresponding process in the above method embodiment, which is not described here.

In the embodiments mentioned in the disclosure, it is to be understood that, the disclosed system, apparatus and method may be implemented in other ways. For example, the above apparatus embodiment is only illustrative. For example, the division of the modules or units is only a logical functional division. In practice, there may be other divisions. For example, multiple units or assembles may be combined or integrated into another system. Alternatively, some features may be neglected or not be performed. The displayed or discussed mutual coupling or direct coupling or communication connection may be an indirect coupling or communication connection via some interfaces, devices or units, which may be in an electrical, mechanical or other form.

The unit described as a separate component may be or may not be separate physically, and the component which is shown as a unit may be or may not be a physical unit, that is, may be located at a position, or may be distributed over multiple network units. Some or all of the units may be selected as required to implement the solution of the embodiment.

Further, the functional units in the embodiments of the disclosure may be integrated into one processing unit, and may exist physically separately, and may be integrated into one unit by two or more. The above integrated unit may be implemented in hardware, and may also be implemented by using a software functional unit.

When being implemented by using a software functional unit and being sold and used as a separate product, the integrated unit may be stored in a computer readable storage medium. Based on this, essential part or a part contributing to the conventional art of the technical solution of the disclosure or the whole or part of the technical solution may be embodied in a software product which is stored in a storage medium, including several instructions for causing a computer device (which may be a personal computer, a server, a network device or the like) or a processor to perform all or some of the steps of the method in the embodiment of the disclosure. The existing storage medium includes various mediums capable of storing program code, such as U disk, movable disk, ROM (Read-Only Memory)\ RAM (Random Access Memory), magnetic disk or optical disk.

Specifically, computer program instructions corresponding to an information processing method in an embodiment of the disclosure may be stored in the storage medium such as optical disk, hard disk or U disk, which when be read or executed by an electronic apparatus include:

acquiring M variation messages by monitoring variations of files in a file system of an electronic apparatus, where M is a positive integer;

determining N files based on the M variation messages, where wherein the N files are varied corresponding to the M variation messages, and N is an integer less than or equal to M;

identifying the N files respectively to determine at least one of the N files which meets a preset condition; and deleting the at least one file to reduce the amount of data stored in the electronic apparatus.

Optionally, before a computer instruction stored in the storage medium corresponding to the step of deleting the at least one file is executed, the computer program instructions further include:

storing the M variation messages into a first level cache file folder sequentially, where the maximum number of file folders that the first level cache file folder is capable of storing is K, where K is an integer greater than or equal to 2;

grouping the M variation messages into N groups, where each variation message in a first group of the N groups corresponds to a first file which is one of the N files; and storing the N groups of variation messages into N variation message file folders of the first level cache file folder respectively, where the variation message file folders are configured to store the variation messages.

Optionally, after a computer instruction stored in the storage medium corresponding to the step of storing the N groups of variation messages into the N variation message file folders of the first level cache file folder respectively is executed, the computer program instructions further include:

determining a first variation message file folder of the N variation message file folders in the case that N is greater than K; and releasing the first variation message file folder from the first level cache file folder.

Optionally, a computer instruction stored in the storage medium corresponding to the step of determining the first one of the N variation message file folders includes:

determining the first variation message file folder with a variation message file folder including most variation messages; or determining the first variation message file folder with a variation message file folder which has a longest time period prior to a current time instant since a time instant of latest update, where the current time instant is a time instant at which the first variation message file folder is determined; or determining the first variation message file folder with a variation message file folder to which a file with a maximum amount of data corresponds.

Optionally, a computer instruction stored in the storage medium corresponding to the step of deleting the at least one file includes:

deleting the at least one file corresponding to variation messages included in the first variation message file folder; or deleting the at least one file corresponding to variation messages included in the first variation message file folder and deleting the first variation message file folder.

Optionally, before a computer instruction stored in the storage medium corresponding to the step of deleting the at least one file is executed, the computer program instructions further include:

storing the file corresponding to variation messages included in the first variation message file folder into a second level cache file folder, where the maximum number of files that the second level cache file folder is capable of storing is Q, where Q is an integer greater than or equal to 2.

Optionally, a computer instruction stored in the storage medium corresponding to the step of deleting the at least one file includes:

deleting all files included in the second level cache file folder in the case that the number of files included in the second level cache file folder is equal to Q.

Optionally, a computer instruction stored in the storage medium corresponding to the step of determining the N files based on the M variation messages includes:

determining M files one-to-one corresponding to the M variation messages; and determining the N files of the M files which have mutually different file names.

Optionally, a computer instruction stored in the storage medium corresponding to the step of identifying the N files respectively to determine the at least one of the N files which meets the preset condition includes:

determining the at least one of the N files which has a file name suffix belonging to a predetermined name suffix set.

Optionally, a computer instruction stored in the storage medium corresponding to the step of determining the N files based on the M variation messages includes:

determining M files one-to-one corresponding to the M variation messages;

determining N storing paths of M storing paths of the M files, wherein the N storing paths are different from each other; and determining the N files with N file folders corresponding to the N storing paths.

Optionally, a computer instruction stored in the storage medium corresponding to the step of identifying the N files respectively to determine the at least one of the N files which meets the preset condition includes:

determining at least one of N file folder names of the N file folders which belongs to a first predetermined file folder name set; and determining the at least one file with at least one file folder corresponding to the at least one file folder name.

Optionally, a computer instruction stored in the storage medium corresponding to the step of deleting the at least one file includes:

deleting some of the at least one file folder, and displaying remaining file folders of the at least one file folder on a display unit of the electronic apparatus, where file folder names of the remaining file folders belong to a second predetermined file folder name set which is a subset of the first predetermined file folder name set;

receiving an deletion operation on the remaining file folders from a user; and deleting the remaining file folders based on the deletion operation.

Optionally, a computer instruction stored in the storage medium corresponding to the step of identifying the N files respectively to determine the at least one of the N files which meets the preset condition includes:

determining the at least one file with at least one of the N file folders which is empty.

Optionally, after a computer instruction stored in the storage medium corresponding to the step of deleting the at least one file is executed, the computer program instructions further include:

generating history deletion information for the at least one file, where the history deletion information is attribute information of the at least one file and/or operation information corresponding to an deletion operation performed on the at least one file; and outputting the history deletion information.

As described above, the above embodiments are only intended to describe in detail the technical solutions of the disclosure. The above explanations of the embodiments are only intended to help understanding the method of the disclosure and its core idea, but not to limit the disclosure. Variations and alternations are conceivable to those skilled in the art within the technical scope disclosed in the disclosure, which fall within the scope of protection of the disclosure.

The invention claimed is:

1. An information processing method, comprising:
   acquiring, by an electronic apparatus, M variation messages by monitoring variations of files in a file system of the electronic apparatus by running a callback function, where M is a positive integer;
   determining, by the electronic apparatus, N files based on the M variation messages, wherein the N files are varied corresponding to the M variation messages, and N is an integer less than or equal to M;
   identifying, by the electronic apparatus, the N files respectively to determine at least one of the N files is a useless file; and
   deleting, by the electronic apparatus, the at least one file to reduce the amount of data stored in the electronic apparatus;
   wherein determining N files based on the M variation messages comprises:
   storing the M variation messages into a first level cache file folder sequentially, wherein the maximum number of file folders that the first level cache file folder is capable of storing is K, where K is an integer greater than or equal to 2;
   grouping the M variation messages into N groups, wherein each variation message in a first group of the N groups corresponds to a first file which is one of the N files; and
   storing the N groups of variation messages into N variation message file folders of the first level cache file folder respectively, wherein the variation message file folders are configured to store the variation messages; and
wherein identifying the N files respectively to determine at least one of the N files which is a useless file comprises:
determining a first variation message file folder of the N variation message file folders in the case that N is greater than K; and
releasing the first variation message file folder from the first level cache file folder.

2. The method according to claim 1, wherein determining the first variation message file folder of the N variation message file folders comprises:
determining the first variation message file folder with a variation message file folder including most variation messages; or
determining the first variation message file folder with a variation message file folder which has a longest time period prior to a current time instant since a time instant of latest update, wherein the current time instant is a time instant at which the first variation message file folder is determined; or
determining the first variation message file folder with a variation message file folder which corresponds to a file with a maximum amount of data.

3. The method according to claim 1, wherein deleting the at least one file comprises:
deleting the at least one file corresponding to variation messages included in the first variation message file folder; or
deleting the at least one file corresponding to variation messages included in the first variation message file folder and deleting the first variation message file folder.

4. The method according to claim 1, wherein before deleting the at least one file, the method further comprises:
storing a file corresponding to variation messages included in the first variation message file folder into a second level cache file folder, wherein the maximum number of files that the second level cache file folder is capable of storing is Q, wherein Q is an integer greater than or equal to 2.

5. The method according to claim 4, wherein deleting the at least one file comprises:
deleting all files included in the second level cache file folder in the case that the number of files included in the second level cache file folder is equal to Q.

6. The method according to claim 1, wherein determining the N files based on the M variation messages comprises:
determining M files one-to-one corresponding to the M variation messages; and
determining the N files of the M files which have mutually different file names.

7. The method according to claim 6, wherein identifying the N files respectively to determine the at least one of the N files which is a useless file comprises:
determining the at least one of the N files which has a file name suffix belonging to a predetermined name suffix set.

8. The method according to claim 1, wherein determining the N files based on the M variation messages comprises:
determining M files one-to-one corresponding to the M variation messages;
determining N storing paths of M storing paths of the M files, wherein, the N storing paths are different from each other; and
determining the N files with N file folders corresponding to the N storing paths.

9. The method according to claim 8, wherein identifying the N files respectively to determine the at least one file of the N files which is a useless file comprises:
determining at least one of N file folder names of the N file folders which belongs to a first predetermined file folder name set; and
determining the at least one file with at least one file folder corresponding to the at least one file folder name.

10. The method according to claim 9, wherein deleting the at least one file comprises:
deleting some of the at least one file folder, and displaying remaining file folders of the at least one file folder on a display unit of the electronic apparatus, wherein file folder names of the remaining file folders belong to a second predetermined file folder name set which is a subset of the first predetermined file folder name set;
receiving an deletion operation on the remaining file folders from a user; and
deleting the remaining file folders based on the deletion operation.

11. The method according to claim 8, wherein identifying the N files respectively to determine the at least one of the N files which is a useless file comprises:
determining the at least one file with at least one of the N file folders which is empty.

12. The method according to claim 1, wherein after deleting the at least one file, the method further comprises:
generating history deletion information for the at least one file, wherein the history deletion information is attribute information of the at least one file and/or operation information corresponding to an deletion operation performed on the at least one file; and
outputting the history deletion information.

13. An electronic apparatus, comprising:
a housing; and
a processor, provided inside the housing and configured to acquire M variation messages by monitoring variations of files in a file system of the electronic apparatus by running a callback function, to determine N files based on the M variation messages, to identify the N files respectively to determine at least one of the N files which is a useless file, and to delete the at least one file to reduce the amount of data stored in the electronic apparatus,
wherein the N files are varied corresponding to the M variation messages, M is a positive integer and N is an integer less than or equal to M; and
wherein the processor is further configured to:
store the M variation messages into a first level cache file folder sequentially before deleting the at least one file, wherein the maximum number of file folders that the first level cache file folder is capable of storing is K, where K is an integer greater than or equal to 2;
group the M variation messages into N groups, wherein each variation message in a first group of the N groups corresponds to a first file which is one of the N files;
store the N groups of variation messages into N variation message file folders of the first level cache file folder respectively, wherein the variation message file folders are configured to store the variation messages;
determine a first variation message file folder of the N variation message file folders in the case that N is greater than K, after storing the N groups of variation messages into the N variation message file folders of the first level cache file folder respectively; and
release the first variation message file folder from the first level cache file folder.

14. The electronic apparatus according to claim 13, wherein the processor is configured to:
determine the first variation message file folder with a variation message file folder including most variation messages; or
determine the first variation message file folder with a variation message file folder which has a longest time period prior to a current time instant since a time instant of latest update, wherein the current time instant is a time instant at which the first variation message file folder is determined; or
determine the first variation message file folder with a variation message file folder which corresponds to a file with a maximum amount of data.

15. The electronic apparatus according to claim 13, wherein the processor is configured to:
delete the at least one file corresponding to variation messages included in the first variation message file folder; or
delete the at least one file corresponding to variation messages included in the first variation message file folder and deleting the first variation message file folder.

16. The electronic apparatus according to claim 13, wherein the processor is further configured to:
store a file corresponding to variation messages included in the first variation message file folder into a second level cache file folder before deleting the at least one file, wherein the maximum number of files that the second level cache file folder is capable of storing is Q, wherein Q is an integer greater than or equal to 2.

17. The electronic apparatus according to claim 16, wherein the processor is configured to:
delete all files included in the second level cache file folder in the case that the number of files included in the second level cache file folder is equal to Q.

18. The electronic apparatus according to claim 13, wherein the processor is configured to:
determine M files one-to-one corresponding to the M variation messages; and
determine the N files of the M files which have mutually different file names.

19. The electronic apparatus according to claim 18, wherein the processor is configured to:
determine the at least one of the N files which has a file name suffix belonging to a predetermined name suffix set.

20. The electronic apparatus according to claim 13, wherein the processor is configured to:
determine M files one-to-one corresponding to the M variation messages;
determine N storing paths of M storing paths of the M files, wherein, the N storing paths are different from each other; and
determine the N files with N file folders corresponding to the N storing paths.

21. The electronic apparatus according to claim 20, wherein the processor is configured to:
determine at least one of N file folder names of the N file folders which belongs to a first predetermined file folder name set; and
determine the at least one file with at least one file folder corresponding to the at least one file folder name.

22. The electronic apparatus according to claim 21, further comprising a display device configured to display information,
wherein the processor is configured to:
delete some of the at least one file folder, and display remaining file folders of the at least one file folder on the display device, wherein file folder names of the remaining file folders belong to a second predetermined file folder name set which is a subset of the first predetermined file folder name set;
receive an deletion operation on the remaining file folders from a user; and
delete the remaining file folders based on the deletion operation.

23. The electronic apparatus according to claim 20, wherein the processor is configured to:
determine the at least one file with at least one of the N file folders which is empty.

24. The electronic apparatus according to claim 13, wherein the processor is configured to generate history deletion information for the at least one file, wherein the history deletion information is attribute information of the at least one file and/or operation information corresponding to an deletion operation performed on the at least one file; and
the electronic apparatus further comprises an outputting device configured to output the history deletion information.

* * * * *